United States Patent [19]

Schetina et al.

[11] 4,157,773

[45] Jun. 12, 1979

[54] GREASE GUN

[75] Inventors: Otto Schetina; Herwig Wrulich; Alfred Zitz, all of Zeltweg, Austria

[73] Assignee: Vereinigte Osterreichische Eisen- und Stahlwerke-Alpine Montan Aktiengesellschaft, Vienna, Austria

[21] Appl. No.: 798,251

[22] Filed: May 18, 1977

[30] Foreign Application Priority Data

May 25, 1976 [AT] Austria .................................. 3836/76
Apr. 20, 1977 [AT] Austria .................................. 2754/77

[51] Int. Cl.² ...................... G01F 11/04; G01F 11/16; F16N 11/10; F04B 5/00
[52] U.S. Cl. .................................. 222/263; 222/334; 222/389; 184/29; 417/403
[58] Field of Search ............... 222/334, 263, 253, 378, 222/249, 319, 389; 184/29, 26, 39; 92/108, 110; 417/403, 514, 547

[56] References Cited

U.S. PATENT DOCUMENTS

| | | | |
|---|---|---|---|
| 1,529,918 | 3/1925 | Richards | 222/334 X |
| 1,621,657 | 3/1927 | Cooper et al. | 417/403 X |
| 1,657,819 | 1/1928 | Cooper et al. | 417/403 |
| 2,058,455 | 10/1936 | Huff | 417/547 X |
| 3,327,906 | 6/1967 | Gömann | 222/389 |

Primary Examiner—Robert J. Spar
Assistant Examiner—Edward M. Wacyra
Attorney, Agent, or Firm—Cushman, Darby & Cushman

[57] ABSTRACT

A grease gun comprising a hollow piston rod driven by a pressure fluid upon an annular drive piston at one end of the rod, compressing a supply of grease by an annular plunger at the other end of the rod into a receiving chamber within the piston rod, which chamber cooperates with a stationary surface, upon reversely driving the piston rod, to expel the grease through a conduit from the chamber at a higher pressure than the driving fluid.

10 Claims, 3 Drawing Figures

GREASE GUN

This invention is in reference to a grease gun, propelled by a pressure medium, with an adjustable plunger in a cylinder, that can be filled with grease, and a grease pressure arm, which has a smaller diameter than the grease plunger, and whose field of operation is connected to the field of operation of the grease plunger via a relief valve, which opens in the direction of the field of operation of the grease pressure arm, and is connected via a canal within the grease pressure arm with a connector plug for the lubrication piping, to be fed, and with a driving piston, guided in a driving cylinder, both of whose generating spaces are alternatingly set under pressure by the pressure medium, whereby the driving piston, the grease plunger and the grease pressure arm are arranged equal-armed. Hereby, the cylinder of the grease plunger forms a grease storage area, from which the lubricating grease is pressed via the relief valve into the generating space of the grease pressure arm, when the grease plunger is set in operation. Since in this process only the resistance of the relief valve has to be overcome, the discharge pressure of the grease plunger can be relatively low and therefore this grease plunger can have a relatively large piston surface, so that the storage area can be chosen to be large. Since the grease pressure arm has a smaller piston surface, it can press the lubricant with a high pressure to the point of lubrication. The operation of the grease gun with a pressure medium, which could be either air pressure or pressure fluid, offers, compared to the propelling with a driving motor, for instance an electric motor, the advantage, that rotating parts are eliminated. For the known grease guns of this kind, the pressure medium is lead alternately into the two generating spaces of the driving piston, which is connected with the grease pressure arm and drives it to a to-and-fro motion. During the suction stroke of the grease pressure arm, the grease plunger is supposed to press the lubricant from the storage space via the relief valve into the generating area of the grease plunger. For the known grease guns of this kind it is therefore also necessary, that provisions are made to propel the grease plunger as well and therefore the cylinder of the grease plunger, on the other side of the grease plunger, must be capable to admit and contain the pressure medium. This brings the disadvantage, that the grease plunger must seal against the pressure medium as well, whereby higher requirements are set for the sealing capacity of the guideway of the grease plunger in the cylinder, than for a seal against the lubricant. Aside from this, it must also be considered, that the construction of such a grease gun and the steering of the pressure medium is complicated.

The invention has the purpose to improve such a grease gun and consists mainly in the fact, that the grease pressure arm is rigidly attached with the working cylinder and that the cylinder of the grease pressure arm in turn is rigidly connected to the grease plunger and the driving piston. Thereby the high pressure segment, consisting of the cylinder of the grease pressure arm and the grease pressure arm itself, of the grease gun, as well as the grease plunger with the driving piston mechanically connected, so that the driving force for both segments comes from one single driving piston. In this manner the construction of the grease gun is greatly simplified. Even if the working piston in the working cylinder is sealed insufficiently, the functioning remains guaranteed. The grease gun as per invention is particularily suitable for mining equipment and therefore it is prefered to use pressure fluid from the hydraulic system of the machine as the pressure medium. Since the grease plunger is not set under stress by the pressure medium, the danger is avoided, that a leakage will produce a mixing of the pressure fluid with the lubrication grease. In a more advanced construction of the invention, the cylinder of the grease pressure arm forms the piston rod of the grease plunger and the piston rod of the driving piston.

Since the stroke of the grease pressure arm is equal to the stroke of the grease plunger, then, as long as the grease plunger is sealed well against the cylinder, the grease pressure arm can only perform small strokes as long as the generating space of the grease plunger is still filled with grease. According to a more advanced version of the invention the generating space of the grease plunger is therefore connected to the space of the grease plunger cylinder, which is on the other side of the grease plunger, partially throttled, via at least one crossectional area of nozzle aperture. This can for instance be achieved in such a way, that the grease plunger is guided leaky in the grease plunger cylinder. Thereby the grease can, during each stroke of the grease plunger, flow from one side to the other, so that the grease plunger, and thereby also the grease pressure arm, can perform a complete stroke. The pressure which is created during the turn of the grease plunger is in the generating space of the plunger, suffices to press the grease through the relief valve into the generating space of the grease pressure arm.

According to a further preferential construction of the invention, the arrangement is made in such a way, that the passing of the grease from the generating space of the grease plunger to the space on the other side of the plunger is throttled more severely, than the passing of the grease from the space on the other side of the grease plunger, to the generating space of the plunger. Thereby it is accomplished, that during the working stroke of the grease plunger at higher pressure is created in the generating space of the grease plunger, and thereby the filling of the generating space of the grease pressure arm is enhanced. During the return stroke of the grease plunger, the pressure to be overcome by the grease plunger is smaller, since the throttle is less. During this return stroke the grease is now supposed to be conveyed from the generating space of the grease pressure arm to the place of lubrication, and considering the circumstance, that the resistance counteracting against the motion of the grease plunger is less, a larger amount of force is available to bring the grease to the lubrication points. This is of relevance since the pressure of the pressure medium, used to operate the grease gun, can be used almost completely for conveying the grease to the points of lubrication. According to the invention, this can for instance be accomplished in such a way, that the grease plunger has openings, which are closed by valve flaps, and open into the direction of its generating space. The arrangement can preferentially be made in such a way, that the openings are placed at the outer perimeter of the grease plunger and that the grease plunger is surrounded by a ring with a C-shaped cross-section with axial mobility, whereby the shank, pointing toward the generating space of the grease plunger, of the C-shaped cross-section is longer and overlaps the opening, and the shank, pointing away from the generating space, of the C-shaped cross-section is short and leaves the opening free. In this manner it is possible to conceive a larger number of openings in the grease plunger and thereby to reduce the throttle during the exchange of the grease from the space on the opposite side of the grease plunger into the generating space of the grease plunger to a minimum, and to steer all these openings with one single movable device, the ring, in the same fashion as a clack valve.

Preferably, the ring, surrounding the grease plunger, consists of an elastic material and is radially slotted and surrounds the grease plunger with radial clearance, whereby the width of the slot allows a joining of the ring to the circumference of the grease plunger. During the working stroke of the grease plunger, the ring is therefore reduced in its diameter and this results in the creation of a choking slot between the ring and the cylinder, through which the grease can pass at a strong throttle, during the working stroke of the grease plunger, while the openings in the grease plunger are closed, so that a relative high amount of pressure is generated in the generating space of the grease plunger. Preferably this ring would have on the side away from the generating space of the grease plunger a larger diameter, than on the one toward this space, and it should furthermore touch the plunger cylinder elastically.

The large surface of the grease plunger, in relation to the piston surface of the grease pressure arm, allows for a large amount of grease to be stored in the generating space of the grease plunger, which is pressed in rations into the generating space of the grease pressure arm. Since the grease plunger and the grease pressure arm must perform equal strokes, the ratio of the size of the generating area is determined by the ratio of the size of the piston surfaces. It is for instance possible, to store a weekly supply of lubricant into the generating space of the grease plunger, and to thrust over a daily requirement into the generating space of the grease pressure arm. For this reason it is advantageous, if the piston surface of the grease plunger is an integral multiple of the piston surface of the grease pressure arm. In the case of a seven-day-week, if would be seven times and in the case of a five-day-week five times.

It is preferable to place the relief valve inside the piston rod of the grease plunger. Thereby a simple construction is created. The unit, consisting of driving piston, the cylinder of the grease pressure arm and grease plunger with relief valve is guided adjustably as such in the drive cylinder and in the cylinder of the grease plunger, so that, after filling the generating area of the grease plunger with grease, only this unit, by alternatingly switching pressure medium supply to the two generating spaces of the driving piston can operate the grease gun. As per this invention, the driving cylinder and the grease plunger cylinder, forming the generating space for the grease plunger, are preferably formed by a common, possibly segmented, cylinder body, whereby this cylinder body has over its total lenght a uniform diameter, which forms a compact aggregate.

The grease gun as invented is because of its minimal requirement for servicing especially useful for mining machinery, like of instance coal augers. If driven by a pressure fluid the invented grease gun can be used advantageously for all machines, which are operated on hydraulic propulsion. But, where ever air pressure is available, the pressure medium can be compressed air as well.

In the drawings, the invention is schematically shown with the aid of construction models.

FIG. 2 represents an axial section along the lines II—II of the FIG. 3, and FIG. 3 shows a view in the direction of the arrow III of the FIG. 2.

Figure 1:
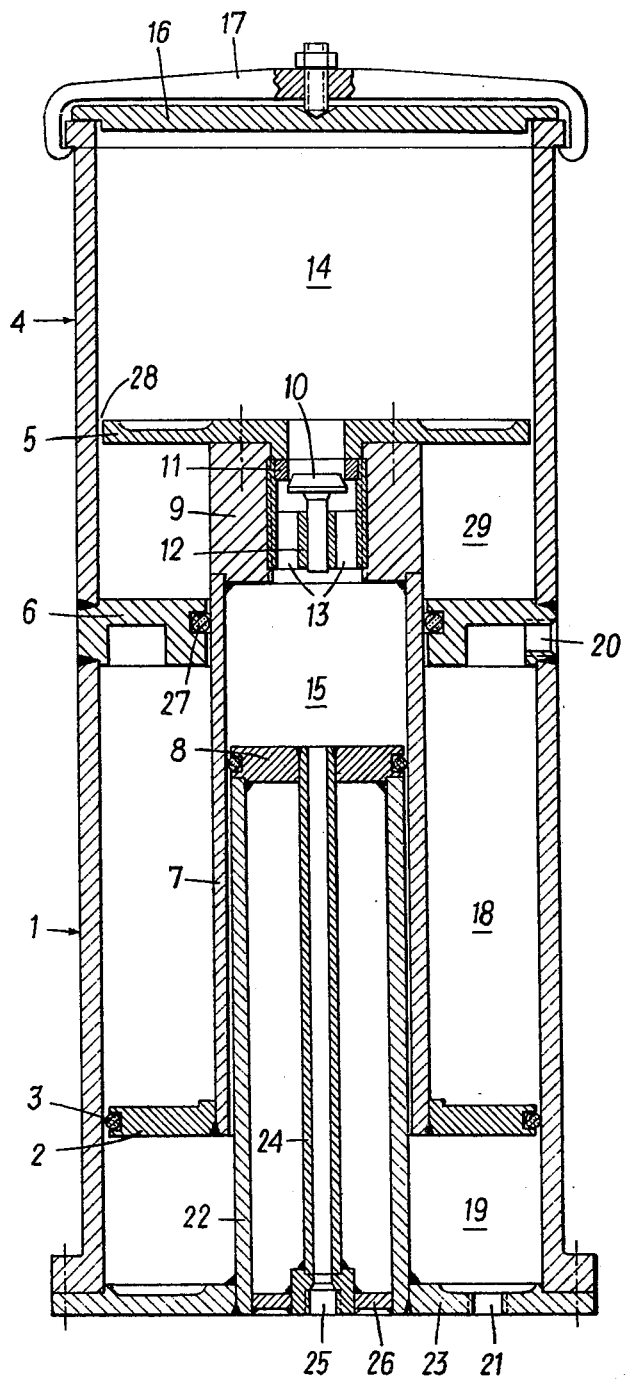
FIG. 1 shows an axial section through a construction model of a grease gun.

In a drawing cylinder 1 the driving piston 2 is guided movably. 3 is a seal for example an O-shaped ring. In a greaser plunger cylinder 4 the grease plunger 5 is guided unsealed and movable, so that the low pressure grease space 29 on the other side of the grease plunger 5 is connected with the low pressure grease space 14 via a ring crevice 28. Between the cylinders 2 and 4 a bottom cylinder casting 6 is inserted. The two cylinders 1 and 4 form together with the bottom cylinder casting 6 a cylinder body of uniform diameter. 27 is a seal, which could for instance be an O-ring, which is placed into an annular tee-slot in the bottom cylinder casting and interacts with the hollow piston rod 7 of the grease plunger 5, which is at the same time the piston rod of the driving piston 2.

The piston rod of the grease plunger 5 is formed as cylinder 7 of the grease pressure arm 8 and via this cylinder 7, the driving piston 2 is rigidly connected to a unit with the grease plunger 5 with the help of a connecting segment 9, which contains a relief valve 10. 11 is the seat of the relief valve and 12 is its guiding element. 13 are the openings, which connect the low-pressure space 14 of the grease plunger 5 with the high-pressure space 15 of the grease pressure arm which consists of a cylinder 22 and a piston face 8. 16 is the cover (lid) for the grease plunger cylinder 4, surrounding the space 14, and which is clamped with a bracket 17 to the cylinder 4. After taking off the lid 16, the low pressure space 14 in the cylinder 4 can be filled with grease.

Cylinder 1 surrounds two ring-shaped fluid-pressure spaces 18 and 19 of the driving piston 2, to which lead the connections 20 and 21 for the pressure medium. The cylinder 22 of the grease pressure arm 8,22 is rigidly affixed to the bottom cylinder casting 23. Through a pipe 24, open toward the space 15 of the grease pressure arm 8,22, the space 15 is connected to the lubrication piping terminal 25, which is set into an inner bottom cylinder casting 26 and to which a lubrication piping or lubricant collecting piping can be connected.

The operation of the device is a follows:

The unit formed out of the driving piston 2, cylinder 7, connecting segment 9 and grease plunger 5 is shown in a middle position. In the position, in which the grease plunger 5 touches the bottom cylinder casing 6, grease is filled into the space 14, which is surrounded by the cylinder 4, after the lid 16 has been removed, then the lid 16 is replaced.

Then pressure medium is introduced through the connection 21 into the fluid-pressure space 19. The driving piston 2 is pressed together with the grease plunger 5 toward the lid 16, whereby the grease is pressed through the relief valve 10 into the high-pressure space 15. For this a relatively small amount of pressure in the space 14 is necessary. In this process the grease moves from the space 14 through the ring crevice 28 into the space 29. After the generating space 15 is filled with grease, pressure medium is pressed via the connection 20 into the pressure-fluid space 18, whereby the connection 21 is connected with a reflux. The driving piston 2 is pushed, together with the cylinder 7, the connecting segment 9 and the grease plunger 5, in the direction of the bottom cylinder casting 23, whereby the size of the space 15 is reduced and the grease is pressed through the pipe 24 and the piping terminal 25 into the lubrication piping or pipings. During this power stroke a relatively high amount of grease pressure is available in the space 15, since the piston surface 8 of the greasepressure arm 8,22 is small in relation to the circular surface of the driving piston 2.

A reflux of the grease from the generating space 15 into the space 14 is made impossible by the relief valve 10, so that the pressure in the space 15 is really built up. Out of the space 29 grease can again escape via the ring crevice 28 into the space 14, so that the full stroke is made possible.

When the grease pressure arm 8 touches the connecting segment 9, the pressure stroke of the grease pressure arm 8 is ended, in relation to cylinder 7. Now pressure medium is pressed into the space 19 through the connection 21, where upon the driving piston 2, together with the cylinder 7, the connecting segment 9 and the grease plunger 5, is pressed into the direction of the lid 16, again, and the space 15 is filled again with grease, where upon then, by leading pressure medium through the connection 20 to the space 18 and connecting of the connection 21 with the reflux, grease can be hauled from the space 15 to the piping terminal 25.

Figure 2:
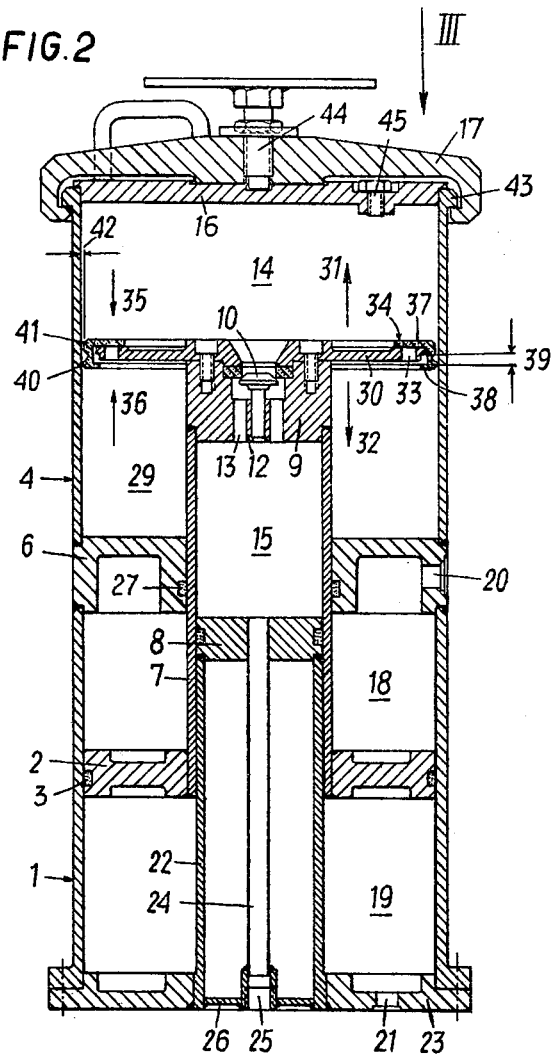
FIG. 2 and 3 show different versions, whereby
Figure 3:
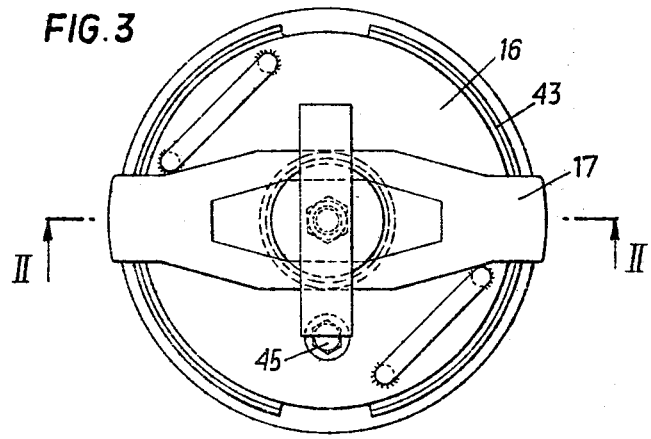

The construction as shown in FIGS. 2 and 3 differs from the construction in FIG. 1 in such a way, that the opening of the grease between the space 14 and the space 29, at the other side of the grease plunger 30, is throttled more severely during the working stroke of the grease plunger 30 in the direction of the arrow 31, than during the return stroke of the same in the direction of the arrow 32.

The grease plunger 30 has on its rim openings 33 and is surrounded by a ring 34. The ring 34 has a C-shaped cross section and surrounds the grease plunger 30 with axial clearance 39, so that it can be moved in an axial direction, as shown by the arrows 35 and 36.

The shank 37 of the C-shaped cross section which is turned toward the generating space 14 is made longer so that it extends over openings 33. The shank 38 of the C-shaped cross section which faces away from the generating space 14 is made shorter so that it leaves open the openings 33. When the grease plunger 30 is moved in the direction of the arrow 31, the ring 34 is displaced axially in the direction of the arrow 35 and the shank 37 of the C-shaped cross section of the ring 34 touches the openings 33 and covers them up. In this manner a large amount of pressure is being built up in the space 14, when the grease plunger 30 moves in the direction of the arrow 31, by which the grease is transported through the relief valve 10 into the space 15 of the grease pressure arm 8. During the movement of the grease plunger 30 in the direction of the arrow 32, the ring 34 is displaced axially in the direction of the arrow 36. Hereby the shank 37 of the C-shaped cross section of the ring 34 lifts off the openings 33 and renders them free. During the stroke of the grease plunger 30 in the direction of the arrow 32, the grease can therefore move with minimal restraint from the space 29, through the openings 33, into the space 14, so that for the stroke of the grease plunger only a minimal amount of force is needed, and the force, which is created by the pressure medium in the space 18 against the driving piston 2, can be used almost totally for the pressure stroke of the grease pressure arm 8.

During the stroke of the grease plunger 30 in direction of the arrow 31 it is on the one hand desirable to create a high amount of pressure in the space 14, but nevertheless, some grease should move from the space 14 into the space 29 on the other side of the grease plunger 30, so that the stroke of the grease pressure arm 8 can complete its complete stroke in the direction of the arrow 31. For this purpose a radial clearance is provided between the grease plunger 30 and the ring 34, and this ring 34 is radially slotted and consists of an elastic material, so that it can reduce its diameter, lift off the wall of the grease plunger cylinder 4 and retract toward the grease plunger 30. In this manner a ring-shaped throttle—crevice is created between the ring 34 and the grease plunger cylinder 4 during the stroke in the direction of the arrow 31, through which grease can penetrate from the space 14 into the space 29, on the other side of the grease plunger 30. The part 40 of the ring 34, which is turned away from the space 14, rests elastically against the grease plunger cylinder 4. The segment 41, turned toward the space 14, has a smaller diameter, so that between this part 41 and the grease plunger cylinder 4 a ring—crevice 42 remains, in which the pressure, built up in the space 14, will become effective. Thereby the ring 34 is with certainty lifted off the grease plunger cylinder 4 and the throttle crevice is formed.

The ring 34 can consist of a sealing material, as for instance plastic.

The lid 16 is clamped down by a bracket 17, which grips over a projecting edge 43, and a pressure screw 44. A screw 45 serves as exhaust, to facilitate the lifting of the lid 16 for the purpose of filling. During the filling of the generating space 14, the grease plunger 30 is situated in its lowest position. Automatically, there remain air bubbles in the grease during the filling, so that even if the grease in the grease plunger cylinder 4 is mostly used up, no complete vacuum is created, which could produce a "boiling" of the grease.

The movement of the driving piston 2 in direction to the bottom cylinder casting 23, during which the grease is pressed out of the space 15 to the lubricant piping terminal 25, is produced by a continuing or intermittant influx of the pressure medium via the connection 20 to the space 18, depending upon the fact, if a continuing or intermittant greasing is desired, during the total time of operation. The influx of the pressure medium through the connection 21 into the space 19 only serves, to fill the space 15 with the proper amounts. This can be done in a period of operating stoppage of the machine to be greased, as for example at night. With the described grease gun one can obtain from a hydraulic pressure of 30 bar, for instance, a pressure of 200 bar in the grease piping.

What we claim is:

1. A grease gun comprising: a hollow piston rod carrying at one end a grease plunger and at its other end an annular drive piston; a grease plunger cylinder surrounding said grease plunger and forming therewith first and second low pressure grease spaces on opposite sides of said plunger, said first space being located on the side of said plunger facing away from said drive piston, said cylinder being adapted to being filled with grease; a driving cylinder surrounding said drive piston and forming therewith first and second pressure fluid spaces on opposite sides of said piston, each of said pressure fluid spaces having a connection associated therewith for receiving pressure fluid; a stationary grease pressure arm fixed at one end to said driving cylinder and having at its other end a piston face located in said hollow piston rod so as to form a high pressure grease space therewith, said piston face being of lesser area than the area of said grease plunger; a relief valve connecting said high pressure grease space to said first low pressure grease space so as to be capable of passing grease from the latter into said high pressure grease space; a high pressure grease outlet conduit associated with said high pressure grease space for passing grease from the latter space through said pressure arm to the exterior of said grease gun; and grease throttling means for throttling the flow of grease between said first and second low pressure grease spaces in said grease plunger cylinder.

2. A grease gun as in claim 1 wherein said grease plunger is guided unsealed in said grease plunger cylinder.

3. A grease gun as in claim 1 wherein said throttling means throttles grease flow from said first low pressure grease space to a greater extent than it throttles grease flow from said second low pressure grease space.

4. A grease gun as in claim 1 wherein said throttling means includes openings in said grease plunger and movable valve means which move into and out of closing relationship with said openings.

5. A grease gun as in claim 4 wherein said openings are located around the edge of said grease plunger and wherein said movable valve means includes an axially movable ring surrounding said grease plunger and having a C-shaped cross-section, the first shank of the C which faces said first low pressure grease space reaching over said openings and the second shank of the C which faces said second low pressure grease space leaving said openings open.

6. A grease gun as in claim 5 wherein there is a radial clearance between said plunger and said ring, said ring being made of elastic material and being radially slotted.

7. A grease gun as in claim 6 wherein said first shank of the C has a greater outside diameter than said second shank and elastically engages said plunger.

8. A grease gun as in claim 1 wherein said relief valve is carried by said hollow piston rod.

9. A grease gun as in claim 1 wherein said grease plunger cylinder and said driving cylinder are of the same diameter and are connected to a common dividing plate through which said hollow piston rod extends.

10. A grease gun as in claim 1 wherein the surface area of said grease plunger is an integral multiple of the surface area of said piston face of said grease pressure arm.

* * * * *